(12) United States Patent
Monden

(10) Patent No.: US 8,416,077 B2
(45) Date of Patent: Apr. 9, 2013

(54) MONITORING SYSTEM AND MONITORING METHOD WHICH MONITOR PERSONS AND MATERIALS PASSING THROUGH MONITORING POINT

(75) Inventor: Akira Monden, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/664,359

(22) PCT Filed: May 23, 2008

(86) PCT No.: PCT/JP2008/059536
§ 371 (c)(1),
(2), (4) Date: Apr. 7, 2010

(87) PCT Pub. No.: WO2008/152897
PCT Pub. Date: Dec. 18, 2008

(65) Prior Publication Data
US 2010/0194566 A1    Aug. 5, 2010

(30) Foreign Application Priority Data

Jun. 14, 2007   (JP) ................................ 2007-157161

(51) Int. Cl.
*G08B 13/14* (2006.01)
(52) U.S. Cl.
USPC ................ 340/568.1; 340/539.1; 340/5.2
(58) Field of Classification Search ............... 340/568.1, 340/539.1, 573.1, 6.1, 8.1, 5.1, 5.2, 5.6, 5.65, 340/573.4, 603
See application file for complete search history.

(56) References Cited

U.S. PATENT DOCUMENTS

| 5,392,028 | A  | * | 2/1995 | Pichl ........................ 340/572.5 |
| 5,845,692 | A  | * | 12/1998 | Kellem et al. ................ 160/118 |
| 7,088,229 | B2 | * | 8/2006 | Johnson ...................... 340/505 |
| 8,205,788 | B1 | * | 6/2012 | Gazdzinski et al. .......... 235/375 |
| 2004/0183673 | A1 | * | 9/2004 | Nageli ..................... 340/539.13 |
| 2006/0187035 | A1 | * | 8/2006 | Adams ...................... 340/545.2 |
| 2008/0043106 | A1 | * | 2/2008 | Hassapis et al. ............. 348/153 |

FOREIGN PATENT DOCUMENTS

| JP | 07-288802 A   | 10/1995 |
| JP | 09-322155 A   | 12/1997 |
| JP | 2003-143593 A | 5/2003  |
| JP | 2005-316787 A | 11/2005 |
| JP | 2005-339172 A | 12/2005 |
| JP | 2006-120086 A | 5/2006  |
| JP | 2006-236183 A | 9/2006  |
| JP | 2006-259857 A | 9/2006  |
| JP | 2007-058314 A | 3/2007  |
| JP | 2007-141146 A | 6/2007  |

* cited by examiner

*Primary Examiner* — Daniel Previl
(74) *Attorney, Agent, or Firm* — Sughrue Mion, PLLC

(57) ABSTRACT

A monitoring system according to the present invention includes a detecting unit, a tracking unit, a place judging unit and a reporting unit. When a pass unpermitted material that is not permitted to pass through a pass monitoring point passes through the pass monitoring point, the detecting unit detects the pass unpermitted material as a fraudulent passing material. The tracking unit tracks a position of the fraudulent passing material detected by the detecting unit. The place judging unit judges whether or not the fraudulent passing material exists inside a predetermined area. The reporting unit visibly reports the position of the fraudulent passing material and the judged result by the place judging unit.

12 Claims, 14 Drawing Sheets

MONITORING SYSTEM AND MONITORING METHOD WHICH MONITOR PERSONS AND MATERIALS PASSING THROUGH MONITORING POINT

CROSS REFERENCE TO RELATED APPLICATIONS

This application is a National Stage of International Application No. PCT/JP2008/059536, filed May 23, 2008, which claims priority from Japanese Patent Application No. 2007-157161, filed Jun. 14, 2007, the contents of all of which are incorporated herein by reference in their entirety.

TECHNICAL FIELD

The present invention relates to a monitoring system, a monitoring method and a monitoring program, which monitor persons and materials that pass through a pass monitoring point. This application is based upon and claims the benefit of priority from Japanese patent application No. 2007-157161, the disclosure of which is incorporated herein in its entirety by reference.

BACKGROUND ART

In order to ensure the safety of secret information, a person and the like which exist inside an area such as a particular room, a building and the like, an idea is typically executed that the person who can pass through an entrance and a path to a particular area is limited to the person who is preliminarily permitted to pass (hereinafter referred to as a pass permitted person). For example, in order to limit the person who can enter a room in which secret information is handled for the sake of secret protection in a corporation and the like, the person who can pass through an entrance of the room is limited. In order to ensure the safety of residents in a complex housing such as a condominium building or the like, the persons except the residents are limited to enter an entrance of the condominium building. The judgment of the pass permission or pass unpermission can be executed based on: evidence indicating pass permission such as an IC card, information known by only the person having the pass permission such as a personal identification number, and, biometrics authentication such as a finger print and a face. The person who can enter the area can be limited by using a door and gate that can be opened by the person permitted to pass in advance.

However, even if the limitation is carried out by opening and closing a door, there is a problem of so-called tailgating in which, when a pass permitted person opens the door, a person who is not permitted to pass (hereinafter referred to as a pass unpermitted person) passes together with the pass permitted person.

An apparatus for avoiding the tailgating is described in Japanese Laid-Open Patent Application JP-P 2005-316787A. In a gate apparatus described in JP-P 2005-316787A, a door that is opened and closed at an interval corresponding to one person is placed, thereby enabling only one person to surely pass and consequently avoiding the tailgating.

Also, another apparatus for avoiding the tailgating is described in Japanese Laid-Open Patent Application JP-P 2006-120086A and Japanese Laid-Open Patent Application JP-P 2006-236183A. In a tailgating detecting system described in JP-P 2006-120086A, visitors are imaged by a camera and the number of the visitors is counted. Then, when the number of the visitors exceeds the number of the persons who carry out action for unlocking a key, a warning message is announced from a speaker placed at an entrance so that the tailgating is avoided. Also, in an entrance and exit managing system described in JP-P 2006-236183A, an RFID tag is given to the person who is allowed to enter, and a video picture in front of a door and information from an RFID reader are combined. Consequently, the door is opened only for the pass permitted person.

On the other hand, as a method of ensuring the safety of a particular area by using a method except the method of limiting a person to be permitted to enter the area, there is a method of detecting an unpermitted invader from a video picture of a monitoring camera. The monitoring camera is placed at a place from which the particular area can be observed, and an observer observes the video picture of the camera and consequently detects the invader. For example, in an invasion material monitoring apparatus described in Japanese Laid-Open Patent Application JP-A-Heisei 07-288802, an invader is automatically detected, and a video picture of the invader is enlarged and projected on a monitoring monitor. Thus, a load of the observer is reduced.

In the method described in JP-P 2005-316787A, the entering action is limited by using the door that is opened and closed at the interval corresponding to one person so that only one person can enter at the same time. Thus, the person is required to act based on the opening and closing interval of the door that is finely controlled, and the action is limited. It takes long time as compared with usual entering action. Convenience is especially dropped when many persons pass simultaneously through an entrance of a corporation just before a business start. Moreover, when a person has a burden or has a body bigger than an assumed interval, there is a possibility that it is difficult for the person to pass. Also, when it is placed at an entrance of a condominium building or the like, a family including at least a parent and a child cannot enter the entrance altogether. That is, when only one person is permitted to enter the entrance at a time, there is a possibility that availability is extremely dropped. Moreover, if a gate is closed to avoid a pass unpermitted person from entering the entrance when the pass unpermitted person tries to pass, a pass permitted person, who tries to pass following the pass unpermitted person, cannot pass. Thus, this hinders the pass permitted person from passing. Also, in the methods described in JP-P 2006-120086A and JP-P 2006-236183A, when the pass unpermitted person who is not permitted to enter the room is located in front of the door, the warning is announced, or the door is not opened, thereby trying to avoid the invasion of the pass unpermitted person. For this reason, even in a case that both of the person who is permitted to enter the room and the person who tries the invasion by using the tailgating are located in front of the door, the warning is announced or the door is not opened. Thus, until the pass unpermitted person disappears, the pass permitted person also receives the warning or waits for the opening of the door. Hence, the pass permitted person is handled similarly to the invader.

If the foregoing conventional techniques are used to avoid the tailgating, the convenience when the pass permitted person passes is extremely dropped. This is because as mentioned above, in order to avoid the invader (pass unpermitted person) who tries an invasion by using the tailgating from entering the entrance, persons including the pass permitted person must be blocked not to pass by using the method that simultaneous passing of two persons is limited or the door is not opened when the invader exists near the pass permitted person.

On the other hand, in the method of ensuring the safety of a particular area by using the method except the method of limiting an enterable person, the convenience of the pass permitted person of the gate is not lost. However, it is important to avoid the invader (pass unpermitted person) from performing fraudulent activities after the invasion. The invasion material monitoring apparatus described in JP-A-Heisei 07-288802 automatically detects the invader, enlarges and projects the video picture of the invader on the monitoring monitor and consequently reduces the load of the observer. However, all of handling manners against invaders are entrusted to judgment of the observer itself. Thus, there is a possibility that the judgment error of the observer or the like leads to an unanticipated result. In particular, if the place where contact with the invader occurs (for example, the place from which the warning is announced for the invader, or the place at which the invader is caught: hereinafter referred to as a handling place) is suitably selected, there is a possibility that the convenience of the pass permitted person is lost or valuable articles inside the monitored area is broken.

DISCLOSURE OF INVENTION

Therefore, an object of the present invention is to provide a monitoring system in which an observer or the like can correctly perform handling of a person or material that fraudulently passes through a pass monitoring point.

A monitoring system according to the present invention includes a detecting means, a tracking means, a place judging means and a reporting means. When a pass unpermitted material that is not permitted to pass through a pass monitoring point passes through the pass monitoring point, the detecting means detects the pass unpermitted material as a fraudulent passing material. The tracking means tracks a position of the fraudulent passing material detected by the detecting means. The place judging means judges whether or not the fraudulent passing material exists inside a predetermined area. The reporting means visibly reports the position of the fraudulent passing material and the judged result by the place judging means.

A monitoring method according to the present invention includes: detecting, when a unpermitted material that is not permitted to pass through a pass monitoring point passes through said pass monitoring point, the unpermitted material as a fraudulent passing material; tracking a position of the fraudulent passing material detected by the detecting means; judging whether or not the fraudulent passing material exists inside a predetermined area; and visibly reporting the position of the fraudulent passing material and the judged result by the place judging means.

The monitoring method according to the present invention is preferred to be attained by a monitoring program executed by a computer.

In the present invention, the position of the fraudulent passing material (for example, the fraudulent invader) that passes through the pass monitoring point is tracked, and the position of the fraudulent passing material currently being tracked is reported by the reporting means. Consequently, when the fraudulent passing material passes through the pass monitoring point and enters the monitored area, a guard and the like can easily know the position of the fraudulent passing material. Also, in the present invention, whether or not the material that fraudulently passes through the pass monitoring point (for example, the fraudulent invader) exists in the predetermined area can be checked by the reporting means. At this time, for example, the predetermined area is set to be an area where handling for the invader can be performed. Thus, it is possible to avoid a human error in which the guard or the like carries out the handling of the invader in the area except the area where the handling for the invader can be performed. As mentioned above, according to the present invention, the observer and the like can correctly handle the invader who passes through the pass monitoring point.

BRIEF DESCRIPTION OF THE DRAWINGS

The above and other objects, advantages and features of the present invention will be more apparent from the following description of certain preferred exemplary embodiments taken in conjunction with the accompanying drawings, in which.

BEST MODE FOR CARRYING OUT THE INVENTION

The exemplary embodiment of the present invention will be described below in detail with reference to the drawings.

Figure 1:
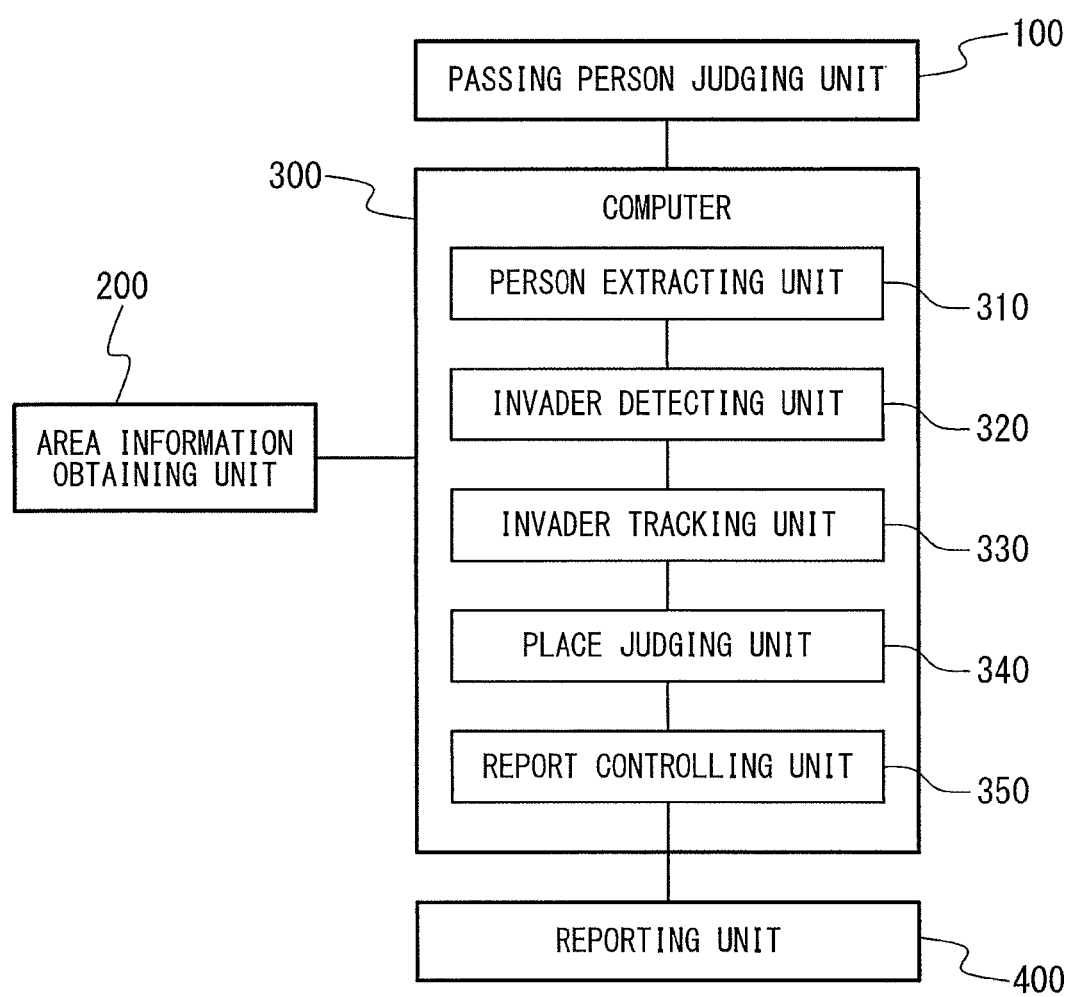
FIG. 1 is a block diagram showing a configuration of a monitoring system in a first exemplary embodiment according to the present invention.

With reference to FIG. 1, a monitoring system according to the first exemplary embodiment of the present invention includes a passing person judging unit 100 (passing material judging means), an area information obtaining unit 200, a computer 300 operated based on a program control, and a reporting unit 400 (reporting means). The computer 300 includes a person extracting unit 310 (extracting means), an invader detecting unit 320 (fraudulent passing material detecting means), an invader tracking unit 330 (tracking means), a place judging unit 340 (place judging unit) and a report controlling unit 350. Those configurations are respectively schematically operated as follows.

The passing person judging unit 100 judges whether or not the person who tries to pass through a pass monitoring point installed at an entrance of a monitored area or the like is a person who is preliminarily permitted to pass (hereinafter referred to as a pass permitted person) or a pass who is not permitted to pass (hereinafter referred to as a pass unpermitted person). In detail, the pass permitted person has pass permission information. The passing person judging unit 100 determines the person who has the pass permission information as the pass permitted person. The pass permission information implies, for example, an ID, a password, and preliminarily registered biometrics information such as a face, an iris, and a fingerprint, and the like. Thus, the passing person judging unit 100 is preferred to use a biometrics authentication apparatus, an IC card reader and the like. The person passing through the pass monitoring point is judged whether or not he or she is a pass permitted person by showing the pass permission information to the passing person judging unit 100. The passing person judging unit 100 authenticates that the person is the pass permitted person based on the pass permission information. If the person passing through the pass monitoring point is the pass permitted person, passing person information of the pass permitted person (for example, ID uniquely assigned to the pass permitted person) is outputted to the computer 300.

The area information obtaining unit 200 is exemplified as a monitoring camera and the like, and obtains picture information (information of a moving picture or still picture) inside the monitored area. Here, preferably, the monitored area imaged by the area information obtaining unit 200 includes the position at which the passing person exists (hereinafter referred to as a pass judgment position), when the passing person shows the pass permission information to the passing person judging unit 100. For example, in a case that the passing person judging unit 100 is a face authentication apparatus, when the passing person passes through the pass monitoring point, his or her face is imaged by the face authentication apparatus. The standing position of the passing person at this time is defined as the pass judgment position, and the monitored area of the area information obtaining unit 200 is set.

The person extracting unit 310 detects the person existing inside the monitored area, from the picture information inside the monitored area obtained by the area information obtaining unit 200 and extracts information with regard to the person (hereinafter referred to as person information). For example, the person extracting unit 310 specifies the material image, which is varied in time series and has a predetermined size, as the person from the picture information inside the monitored area. That is, the person extracting unit 310 extracts the moving material inside the monitored area as the person. At this time, the person extracting unit 310 correlates the position information of the detected person (for example, coordinate information of the person inside the monitored area) to the person and defines as person information.

The invader detecting unit 320 checks the person existing inside the monitored area with the pass permitted person passing through the pass monitoring point, and determines the person who is not coincident with the pass permitted person as an invader (fraudulent passing person: fraudulent passing material). In detail, the invader detecting unit 320 refers to the person information from the person extracting unit 310 and knows the position coordinate of the person inside the monitored area at a predetermined cycle or any timing. When the passing person judging unit 100 reports that the passing person is judged as the pass permitted person, the invader detecting unit 320 determines the person, who exists at the pass judgment position at the same time as this judgment, as the pass permitted person who is already judged to be permitted. Here, the invader detecting unit 320 correlates the passing person information outputted by the passing person judging unit 100 and the person information of the person existing at the pass judgment position. Also, the invader detecting unit 320 determines the person, who exists inside the monitored area without being determined as the pass permitted person who is already judged to be permitted, as the invader (fraudulent passing material).

The invader tracking unit 330 tracks the invader determined by the invader detecting unit 320 and specifies a current position of the invader. Here, the current position implies the position of the newest invader specified from the picture information.

The place judging unit 340 judges whether or not the current position of the invader currently being tracked is the place suitable for performing a predetermined handling of the invader. As an example of the predetermined handling of the invader, there are capture (grabbing) of the invader executed by a guard and warning to the invader. The place suitable for performing the predetermined handling of the invader is preferred to be selected by considering whether or not action of the pass permitted person is disturbed and whether or not there are hazardous material and valuable goods around the place. Hereinafter, the place suitable for performing the predetermined handling of the invader is referred to as the handling available area.

When the invader is detected by the invader detecting unit 320, the report controlling unit 350 controls the reporting unit 400, and reports the invader currently being tracked by the invader tracking unit 330 and the judged result by the place judging unit 340. The reporting unit 400 is the apparatus for visually reporting the information outputted by the report controlling unit 350 to a user (monitoring person). As the reporting unit 400, for example, a display apparatus, a mobile terminal having a displaying function, a spotlight, and an illuminator placed on a floor are preferable.

An entire operation in the first exemplary embodiment of the monitoring system according to the present invention will be described below in detail with reference to FIG. 1 and FIG. 2.

Figure 2:
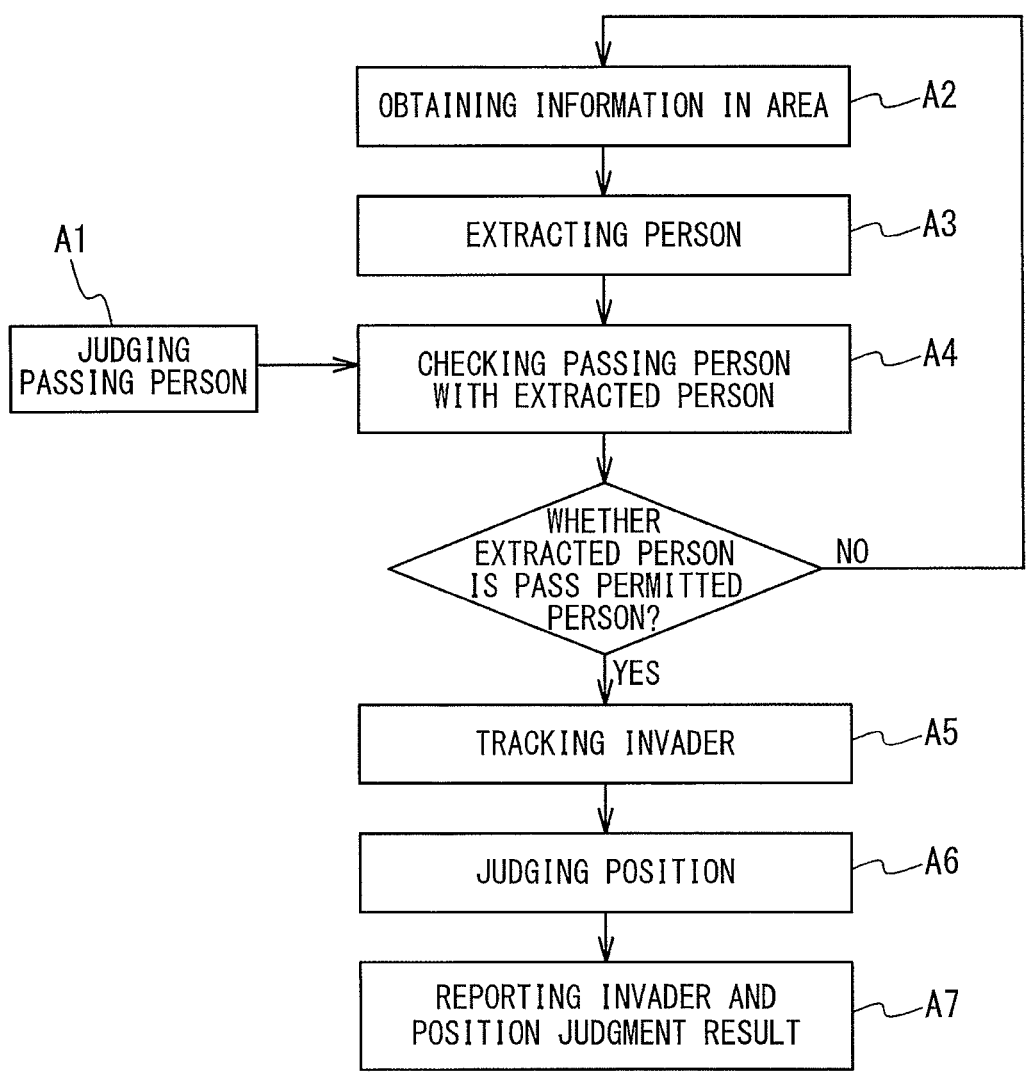
FIG. 2 is a flowchart showing an operation of the monitoring system in the first exemplary embodiment according to the present invention.

The passing person judging unit 100 judges whether a person trying to pass through a pass monitoring point is the person who is permitted to pass (the pass permitted person) or the person who is not permitted to pass (the pass unpermitted person) (Step A1 in FIG. 2).

The area information obtaining unit 200 images a monitored area and obtains picture information inside the monitored area (Step A2 in FIG. 2).

The person extracting unit 310 extracts a person, who exists inside the monitored area, from the picture information inside the monitored area obtained by the area information obtaining unit 200 (Step A3 in FIG. 2). In detail, the person extracting unit 310 detects the person existing inside the monitored area from the obtained picture information and obtains position information of the detected person (for example, coordinate information of the person inside the monitored area). The person extracting unit 310 correlates the position information of the extracted person and a person ID uniquely assigned to the person and outputs as person information.

The invader detecting unit 320 checks the passing person information obtained based on the judged result by the passing person judging unit 100 with the person information obtained by the person extracting unit 310, and carries out a detecting process for an invader (Step A4 in FIG. 2). In detail, when the passing person judging unit 100 reports that the passing person is judged as the pass permitted person, the invader detecting unit 320 correlates the person information coincident with the pass judgment position at the same time as the judgment and the passing person information outputted by the passing person judging unit 100. Then, the invader detecting unit 320 determines the person information (person) to which the passing person information is not correlated as the invader.

The invader tracking unit 330 tracks the invader detected by the invader detecting unit 320 and specifies a current position of the invader (Step A5 in FIG. 2). In detail, the invader tracking unit 330 refers to the person information from the person extracting unit 310 and knows the position coordinate of the person existing inside the monitored area at the predetermined cycle or any timing. The invader tracking unit 330 outputs the person information (the person ID and the position information) of the invader detected by the invader detecting unit 320 to the place judging unit 340 at the predetermined cycle or any timing. At this time, the invader detecting unit 320 uses the picture information that is dynamically updated from the area information obtaining unit 200 and updates the position information of the invader. The invader tracking unit 330 updates the current position of the invader based on the updated position information. Thus, the invader tracking unit 330 can track the invader.

The place judging unit 340 judges whether or not the current position of the invader is located in the handling available area, based on the position information reported by the invader tracking unit 330 (Step A6 in FIG. 2).

When the invader detecting unit 320 detects the invader, the report controlling unit 350 uses the reporting unit 400 and reports the position of the invader currently being tracked by the invader tracking unit 330 and also reports the judgment result as to whether or not the invader exists in the handling available area (Step A7 in FIG. 2).

The effect of this exemplary embodiment will be described below.

This exemplary embodiment is designed such that, when the invader detecting unit 320 detects the invader, the invader tracking unit 330 tracks the invader and then the reporting unit 400 reports the invader. Thus, when the invader passes through the pass monitoring point and enters the area, the guard and the like can quickly specify the invader and can carry out the handling required to avoid the illegal action of the invader.

On the other hand, the operation is not executed in which the action of the person who is permitted to pass is limited. Thus, the convenience of the pass permitted person is not lost.

Also, this exemplary embodiment is designed such that the place judging unit 340 judges whether or not the current position of the invader currently being tracked by the invader tracking unit 330 is located in the handling available area and then the reporting unit 400 reports the judgment result as to whether or not the invader exists in the handling available area. Thus, the human error can be avoided in which the guard or the like carries out the handling of the invader in the place except the handling available area.

Next, the first exemplary embodiment of the present invention will be described below in detail by using a specific example.

In this specific example, the present invention is applied to monitor a pass unpermitted person at an entrance of an office in order to avoid a person except permitted employees from entering the office and carrying out fraudulent action inside the office.

In this specific example, predetermined handling of the invader implies that a guard catches the invader.

In this specific example, a pass monitoring point implies the entrance of the office. When there is a plurality of entrances, all of the entrances serve as the pass monitoring points.

Figure 3:
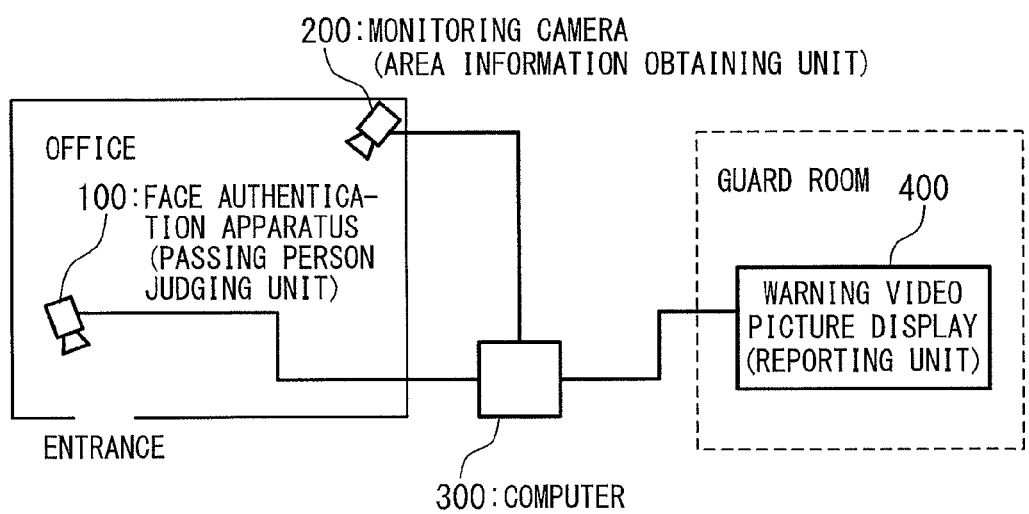
FIG. 3 is a block diagram showing one example of a configuration of the monitoring system in the first exemplary embodiment according to the present invention.

In this specific example, as shown in FIG. 3, the monitoring system includes: a face authentication apparatus 100 as the passing person judging unit 100 at the pass monitoring point, namely, an entrance of an office; a monitoring camera 200 imaging the inside of the office as the area information obtaining unit 200; and a warning video picture display 400 as the reporting unit 400 in a guard room. Those face authentication apparatus 100, monitoring camera 200 and warning video picture display 400 are connected to a computer 300.

When a person enters the office from the entrance, the face authentication apparatus 100 authenticates his or her face of the entering person and judges whether or not the person is permitted to enter the office. The face authentication apparatus 100 reports the judgment result to the invader detecting unit 320 in the computer 300.

Also, the monitoring camera 200 images the video picture inside the office and reports the imaged video picture as the picture information (for example, a moving picture) to the person extracting unit 310 in the computer 300.

The person extracting unit 310 performs an image processing on the video picture (picture information) inside the office obtained by the monitoring camera 200 and extracts the position information of the person existing inside the office. Also, the person extracting unit 310 checks it with the extraction result of a previous time, and consequently extracts the person newly entering the office while discriminating the person newly entering the office from the person existing inside the office from the previous time.

When the information of the entering person is reported by the face authentication apparatus 100, the invader detecting unit 320 checks it with the person extracted by the person extracting unit 310. The invader detecting unit 320 judges whether or not the person newly entering the office is the person permitted to enter the office, namely, the person having the pass permission information of the entering. Then, in the case of the person who is not permitted to pass, the person is specified as the invader.

As a handling method when a plurality of persons passes through the entrance at the same time, for example, a correspondence relation is defined in advance between the position coordinate inside the monitored area (here, the office) when viewed from the monitoring camera 200 and the position coordinate of the pass monitoring point (here, the entrance) when viewed from the face authentication apparatus 100. The face authentication apparatus 100 is designed such that the passing person information (for example, the ID unique to the pass permitted person) reported to the computer 300 includes the position coordinate of the pass monitoring point of the passing pass permitted person. The invader detecting unit 320 determines the person, who exists at the position coordinate of the monitored area corresponding to the position coordinate included in the passing person information, as the pass permitted (entering permitted) person who is already judged to be permitted to enter the office, and then determines the other person as the invader. With such configuration, among the plurality of persons entering the room at the same time, it is possible to determine: the person who is judged to be the pass permitted person by the face authentication apparatus 100; and the person (invader) who is judged to be the pass unpermitted person by the face authentication apparatus 101.

Figure 4:
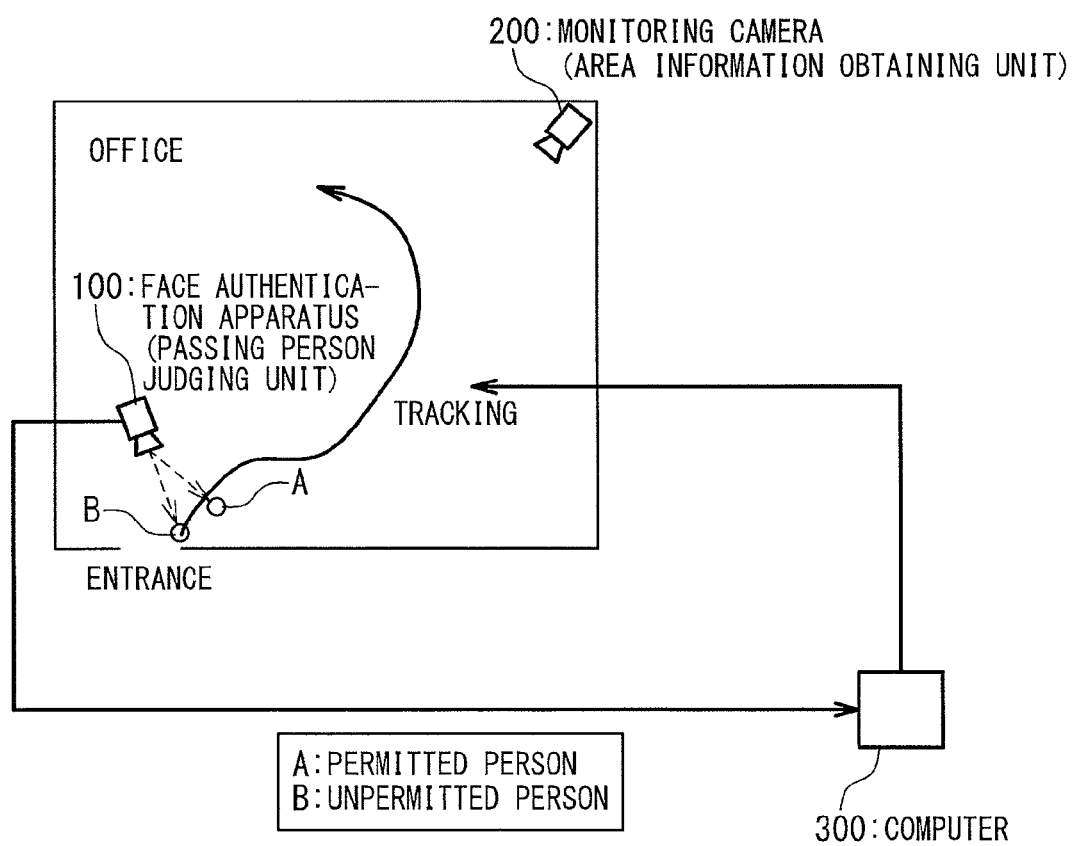
FIG. 4 is a view showing a tracking example of a pass unpermitted person in the monitoring system in the first exemplary embodiment according to the present invention.

When the invader detecting unit 320 detects the invader, the invader tracking unit 330 checks it with the person extracted by the person extracting unit 310 after that time, tracks the invader and then knows the position of the invader inside the office. For example, as shown in FIG. 4, in two passing persons A, B passing through the entrance of the office, if the A is judged to be the pass permitted person and the B is judged to be the pass unpermitted person, the invader tracking unit 331 tracks the B and detects the current position of the B for each frame cycle of the monitoring camera 200 or for each time of its multiple. The current position of the tracked person can be represented, for example, by using the coordinate value in an XY-coordinate system defined on the flat surface of the office (monitored area).

The place judging unit 340 judges whether or not the invader currently being tracked by the invader tracking unit 330 exists in the handling available area. One example of the place judging unit 340 is shown in FIG. 5 as a place judging unit 340A.

Figure 5:
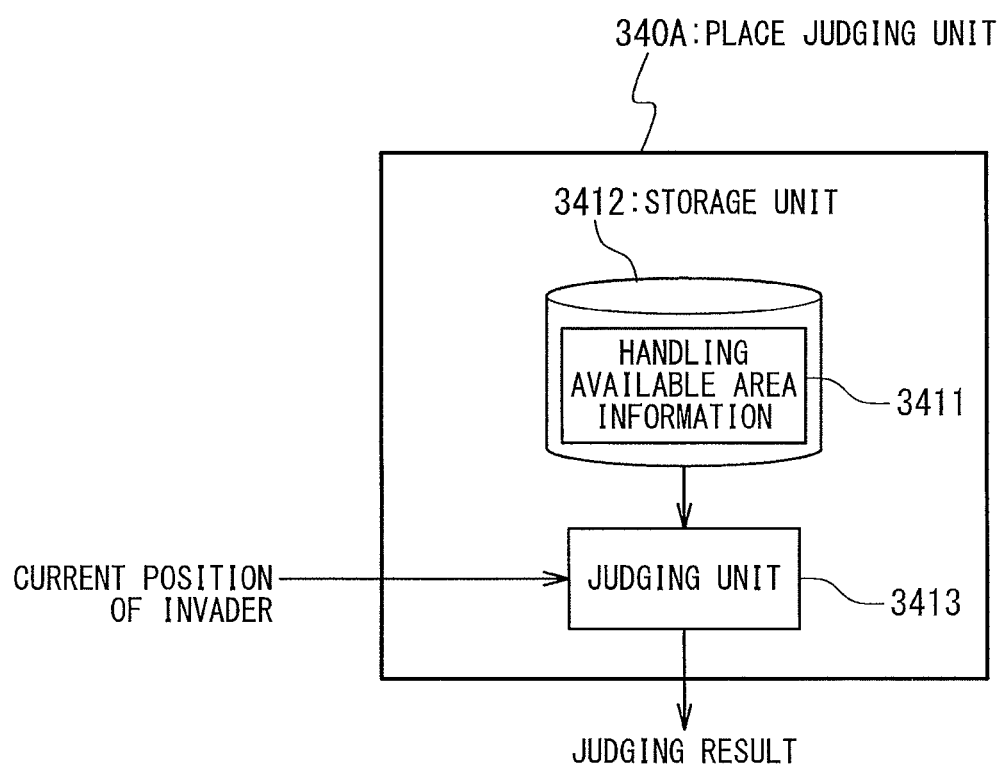
FIG. 5 is a block diagram showing one example of a configuration of a place judging unit in the first exemplary embodiment according to the present invention.

With reference to FIG. 5, the place judging unit 340A includes: a storage unit 3412 storing the position of the handling available area inside the office (monitored area), for example, as handling available area information 3411 indicated by the coordinate value in the XY-coordinate system; and a judging unit 3413 checking the current position of the invader with the handling available area information 3411 and judging whether or not the current position of the invader is located in the handling available area. Differently from this example, handling unavailable area information indicating the position of the place (hereinafter referred to as a handling unavailable area) except the handling available area inside the office may be stored in the storage unit 3412. Then, the judging unit 3413 may check the current position of the invader with the handling unavailable area information 3411 and consequently judge whether or not the current position of the invader is located in the handling available area. Also, the place judging unit 340A may combine both of them and may check the current position of the invader with the handling available area information 3411 and the handling unavailable area information. Then, the place judging unit 340A may examine one of the areas that coincides with the current position of the invader, and consequently may judge whether or not the invader exists inside the handling available area.

As criteria to determine which place inside the office is defined as the handling available area and which place is defined as the handling unavailable area, there are considered: a method in which a spatial narrowness as to whether or not a space where a human can pass is narrow is defined as the criterion; a method in which a peripheral situation as to whether or not there is a damageable important material in a periphery or whether or not there is a fence that is apt to be fallen is defined as the criterion; and a method of combining the foregoing methods.

Figure 6:
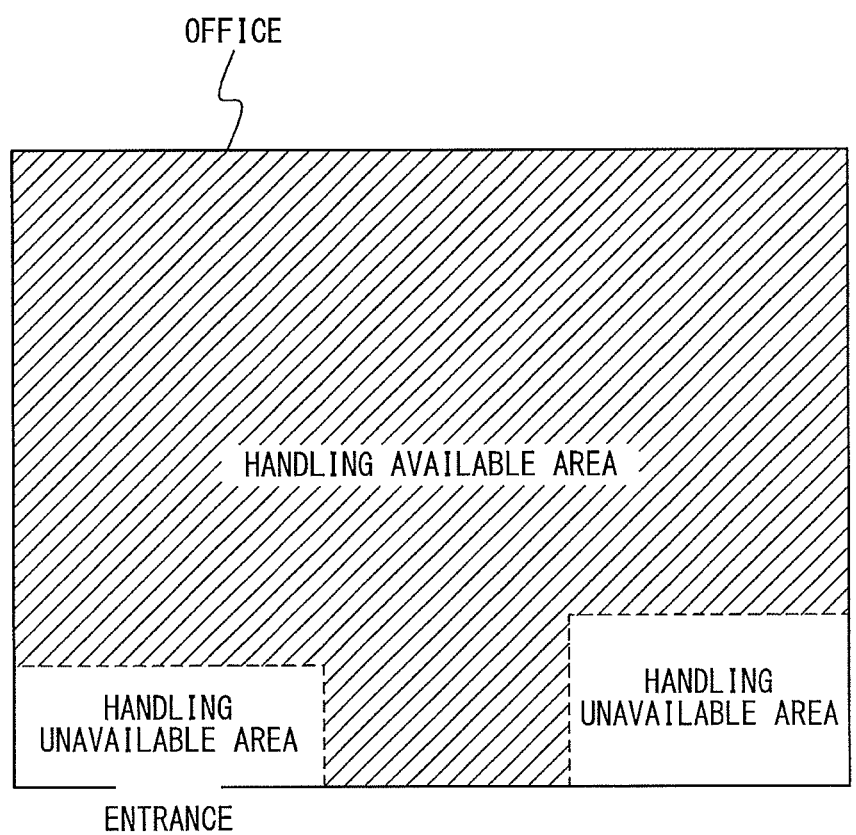
FIG. 6 is a view showing a setting example of an area where handling can be performed and an area where handling cannot be performed inside a monitored area in the first exemplary embodiment of the monitoring system according to the present invention.

FIG. 6 shows one example of the handling available area and handling unavailable area that are set for the office serving as the monitored area. In FIG. 6, the hatched portion serves as the handling available area, and the portions except it serve as the handling unavailable areas. The reason why the periphery near the entrance is set as the handling unavailable area is that if the handling is performed on the invader in the foregoing place severely disturbs the action of the pass permitted person who enters or exits the office. Also, the reason why the low right corner portion on the drawing is set as the handling unavailable area is that the damageable important material exists at this portion.

Figure 7:
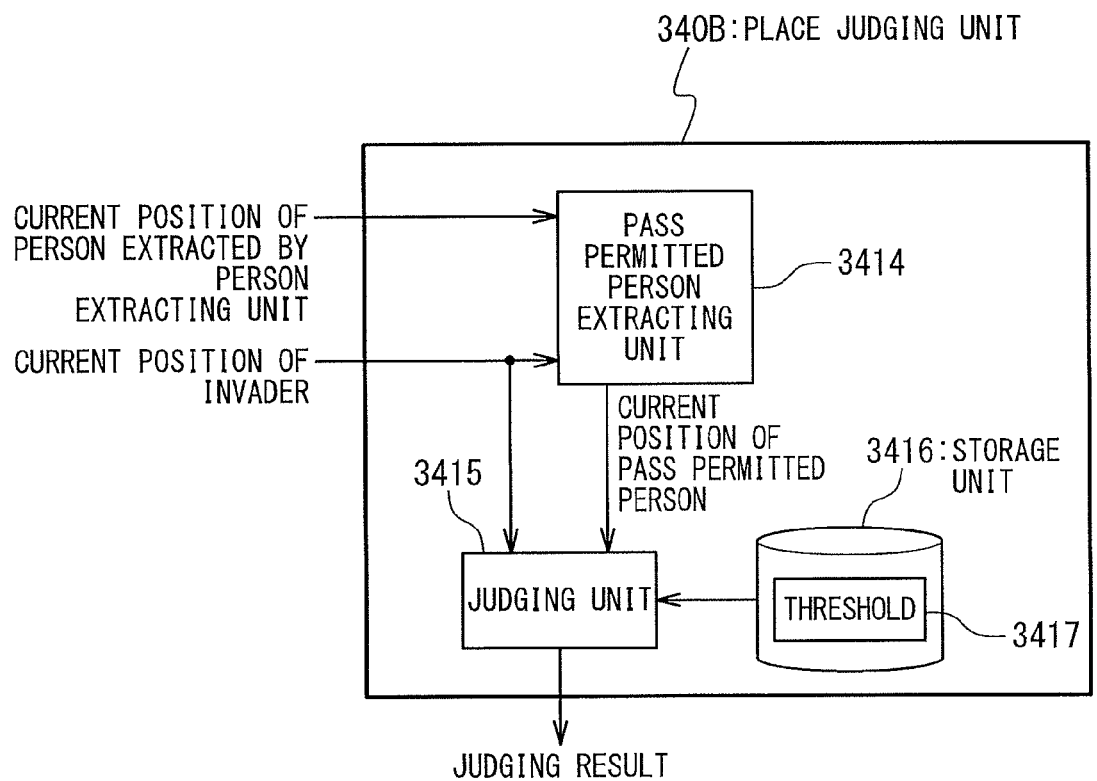
FIG. 7 is a block diagram showing another example of a configuration of the place judging unit in the first exemplary embodiment according to the present invention.

Another example of the place judging unit 340 is shown in FIG. 7, as a place judging unit 340B.

With reference to FIG. 7, the place judging unit 340B includes a pass permitted person extracting unit 3414, a judging unit 3415 and a storage unit 3416.

The pass permitted person extracting unit 3414 compares the current position of the person extracted by the person extracting unit 310 and the current position of the invader currently being tracked by the invader tracking unit 330 and outputs the current position of the person, which is not coincident with the current position of the invader, as the current position of the pass permitted person to the judging unit 3415.

Figure 8A:
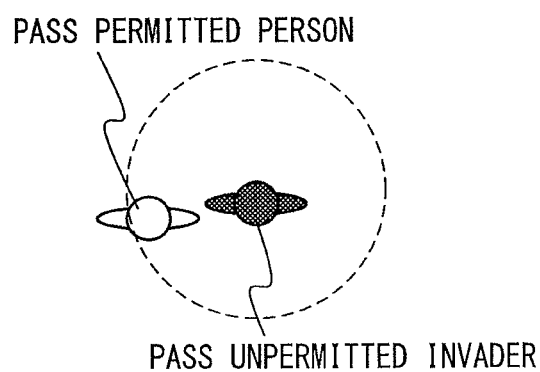
FIG. 8A is an operation description view of the place judging unit according to the present invention.
Figure 8B:
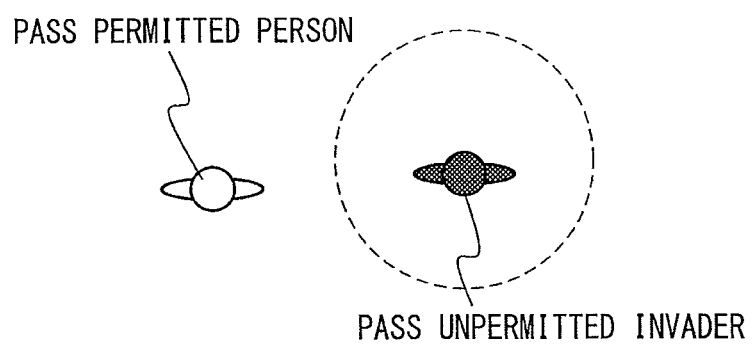
FIG. 8B is an operation description view of the place judging unit according to the present invention.

The judging unit 3415 compares the current position of the invader and the current positions of the respective pass permitted persons who are judged to be permitted to pass (who already enter the office) and judges whether or not the invader exists in the handling available area, depending on whether or not the pass permitted person exists inside a circle having a radius indicated by a threshold 3417 stored in the storage unit 3416 with the invader as a center. For example, as shown in FIG. 8A, if even one pass permitted person exists inside the circle having the radius indicated by the threshold 3417 from the invader, the invader is judged to exist in the handling unavailable area. On the other hand, as shown in FIG. 8B, if even one pass permitted person does not exist inside the circle with the radius indicated by the threshold 3417 from the invader, the invader is judged to exist in the handling available area.

The threshold 3417 can be also set to the same value in all of the areas inside the monitored area. However, for example, in the narrow area, the influence exerted on the pass permitted person becomes severe. In this way, the influence exerted on the pass permitted person is different between the narrow area and the wide area. Thus, in such a way that it is set to be big in the narrow area and it is set to be small in the wide area, the threshold 3417 may be changed, depending on the area. In that case, as for the storage unit 3416, for example, the monitored area is divided into a plurality of areas, and for each area, the threshold 3417 is stored in the storage unit 3416. The judging unit 3415 reads and uses the threshold 3417, which corresponds to the area including the current position of the invader, from the storage unit 3416.

Figure 9:
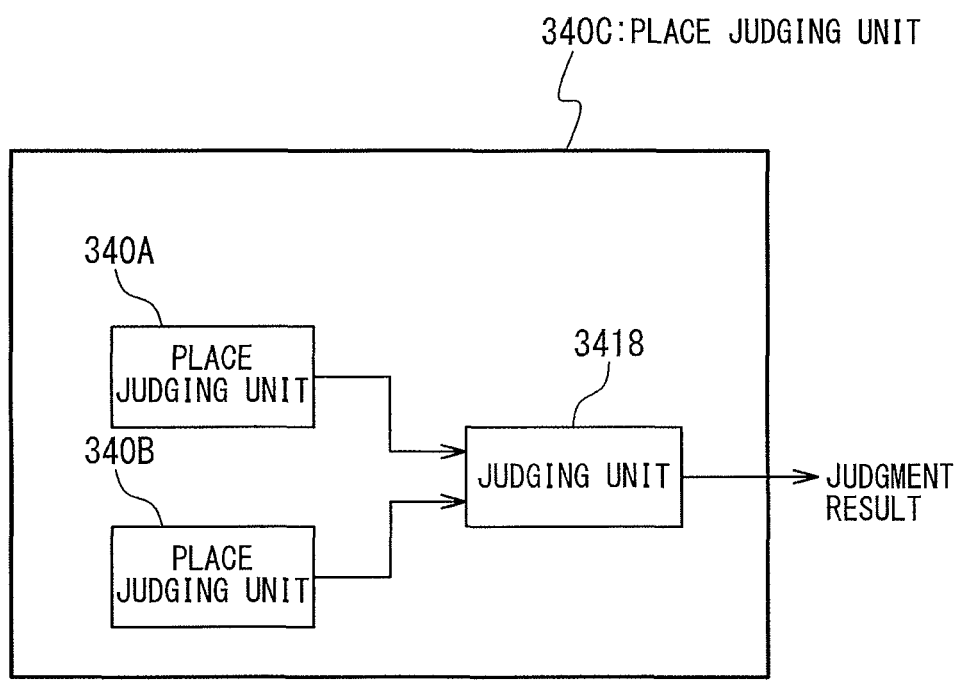
FIG. 9 is a block diagram showing still another example of s configuration of the place judging unit in the first exemplary embodiment according to the present invention.

Another example of the place judging unit 340 is shown in FIG. 9, as a place judging unit 340C.

With reference to FIG. 9, the place judging unit 340C includes the place judging unit 340A in FIG. 5 and the place judging unit 340B in FIG. 4 and further includes a judging unit 3418 outputting the judgment result that the invader exists in the handling available area, only when both of the judgment results of the place judging units 340A and 340B judge that the invader exists in the handling available area. In short, the place judging unit 340C outputs the judgment result that the invader exists in the handling available area, when the invader exists in the predetermined handling available area and also the pass permitted person does not exist within the predetermined distance of the periphery thereof at all.

Figure 10:
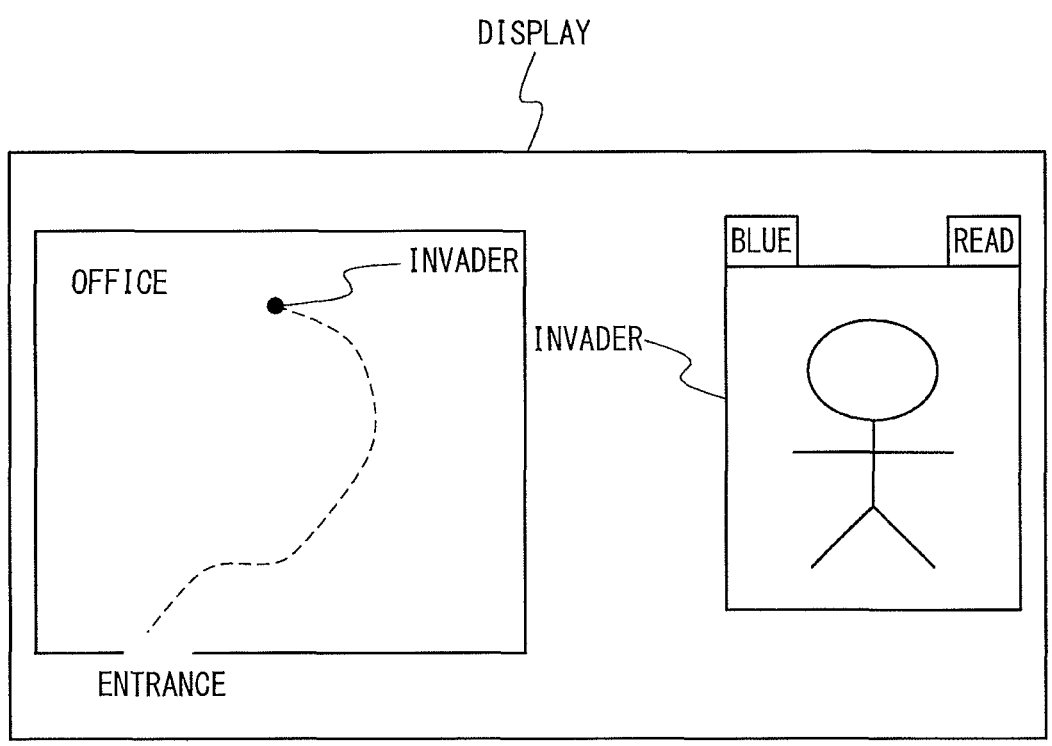
FIG. 10 is a view showing a warning displaying example by a reporting unit in the first exemplary embodiment according to the present invention.

Again with reference to FIG. 3, the report controlling unit 350 controls the warning video picture display 400 and visibly displays the invader detected by the invader detecting unit 320. For example, the report controlling unit 350 displays the position information of the invader currently being tracked by the invader tracking unit 330 and the video picture of the invader, on the screen of the warning video picture display 400, as shown in FIG. 10. In this example, the current position of the invader is indicated with a solid circle on the plan view of the monitored area, and its movement locus is indicated with a dashed line. However, the indication style of the position information of the invader may be arbitrary.

Also, the report controlling unit 350 is preferred to visibly display whether or not the invader exists inside the handling available area, by using the warning video picture display 400. For example, as shown in FIG. 10, a blue lamp and a red lamp are arranged on the upper side of the video picture of the invader, and the report controlling unit 350 turns on any one of the lamps, based on the judged result by the place judging unit 340. Specifically, when the invader exists in the handling available area, the report controlling unit 350 turns on the blue lamp and turns off the red lamp. On the contrary, when the invader exists in the handling unavailable area, the red lamp is turned on, and the blue lamp is turned off. In this example, the judged result by the place judging unit 340 is reported by using the fact that the lamp is turned on or off. However, the reporting style of the judgment result may be arbitrary, such as reporting through a message sentence or the like.

When in the guard room, the guard views the warning video picture display 400 and detects the invader, the guard goes to the place of the invader displayed on the warning video picture display 400 and catches the invader and consequently avoids the invader from carrying out the fraudulent action inside the office. At this time, when the red lamp is on, the handling of the invader is suspended. Then, when the blue lamp is turned on, the handling is carried out, which can avoid the handling at the place except the handling available area, such as the capture bother near the damageable important material which cannot be judged by the visual observation of the guard itself and the like.

In this way, in this exemplary embodiment, the unpermitted person, when passing through the entrance and entering the office, is judged to be the unpermitted person by the face authentication apparatus 100 at the entrance. Then, the position and picture are reported to the guard by the reporting unit 400. Thus, when the person who is not permitted to enter the office, namely, when the person who is not permitted to pass through the entrance, it is possible to avoid the person from carrying out the fraudulent action inside the office.

The person who is permitted to enter the office is only judged to be the person permitted by the face authentication apparatus 100 at the entrance. Thus, the action is not limited. Hence, the convenience of the person who is permitted to enter the office is still kept.

Usually, the entrance of the office is narrow such that only one or several persons can pass at the same time, in many cases. For this reason, this is suitable for specifying the passing person in the passing person judging unit 100 such as the face authentication apparatus 100 and the like. However, at the narrow entrance, when the entrance is closed to prevent the invader from entering the office or when the guard catches the invader to avoid the action of the invader, the convenience of the person who is permitted to pass is severely disturbed. In this exemplary embodiment, the guard can catch the invader in the place wider than the entrance. Thus, the convenience of the person who is permitted to pass is not disturbed.

The displaying through the warning video picture display 400 is carried out to specify the invader. Thus, the person who is permitted to pass can be discriminated from the invader. Hence, it is possible to avoid the guard from erroneously catching the person, who is permitted to enter, as the invader.

Moreover, whether or not the invader exists in the handling available area is mechanically judged and reported to the guard. Thus, it is possible to avoid the human error which is apt to occur in a case that the place where the invader is caught is completely entrusted to the judgment of the guard itself.

This exemplary embodiment is described by using the example in which there is no obstacle that limits the action of the door or the like when the human enters the room. In this case, for example, even in a time zone in which entering persons concentrate, such as the time of the business start of the office and the like, waiting does not occur such as entrance management in which a key of the door or gate is opened and closed. Thus, this has the high convenience. This can be designed such that, although the convenience is somewhat dropped, the door is placed which can be opened only for the person who is permitted to pass, and the person who is not permitted to pass cannot enter the office. Also in this case, as compared with the method in which the door is not opened when there is the person trying the tailgating, the convenience is high because the person who is permitted to pass can always enter the office.

The following various additions and changes can be performed on this exemplary embodiment.

In the above-mentioned exemplary embodiment, the face authentication apparatus is used as the passing person judging unit 100. However, it is possible to use a method used for person authentication, such as a method of using biometrics authentication using fingerprints and an iris except a face, a method of authenticating by using an element possessed only by a permitted person such as an IC card, an RFID tag and the like, a method of authenticating based on information known only by a permitted person such as a password, a secret identification code and the like. Also, the plurality of authentication methods can be combined and used in the passing person judgment. When a plurality of persons pass at the same time such as the case of the tailgating in which the unpermitted person try to pass together with the person permitted to pass, the face authentication determines in advance the correspondence relation between the position viewed from the camera for the face authentication and the position viewed from the monitoring camera consequently correlates the judged result by the passing person judging unit 100 and the extracted result by the person extracting unit 310. On the other hand, when a fingerprint authentication apparatus built in a building is used as the passing person judging unit 100, the position of the fingerprint authentication apparatus viewed from the monitoring camera may be determined in advance. Also in the case of using the IC card or secret identification code, the position of an IC card reader or secret identification code input machine may be determined in advance. When the passing person judging unit 100 is not built in the building, for example, such as a case in which a mobile telephone having a fingerprint authentication function is used as the passing person judging unit 100, the position information is sent from the passing person judging unit 100. Consequently, it is possible to specify the position viewed from the monitoring camera.

The above-mentioned exemplary embodiment is described by using the monitoring camera as the area information obtaining unit 200. However, it is possible to use another sensor that can specify the place in which the person exists, such as a pressure sensor placed in a floor, a supersonic sensor, a temperature sensor, a gravitation sensor and the like.

The above-mentioned example is described using the example in which the warning video picture display 400 placed in the guard room is used as the reporting unit 400 and then the information to specify the invader and the judgment result as to whether or not the invader exists in the handling available area are displayed on the screen. However, a sound and characters can be used to report the invader and inform whether or not the invader exists in the handling available area. Also, when the guard room and the office are separated, there is a possibility that the position of the invader is changed until the guard arrives at the office. For this reason, the portable terminal possessed by the guard can be used as the reporting unit 400, and the position of the invader and the judged result by the place judging unit are transmitted to the portable terminal at any time and displayed therein. Consequently, even if the invader moves, it is possible to recognize the position of the invader and the presence or absence of the existence of the invader in the handling available area.

Also, the reporting unit 400 may be installed inside the monitored area. The report of the invader currently being tracked and the report of the judged result by the place judging unit are sent to the guard room which differs from the office serving as the monitored area. Moreover, the report is sent even inside the monitored area. Thus, the person existing in the office can be cautious about the invasion of the invader.

Figure 11:
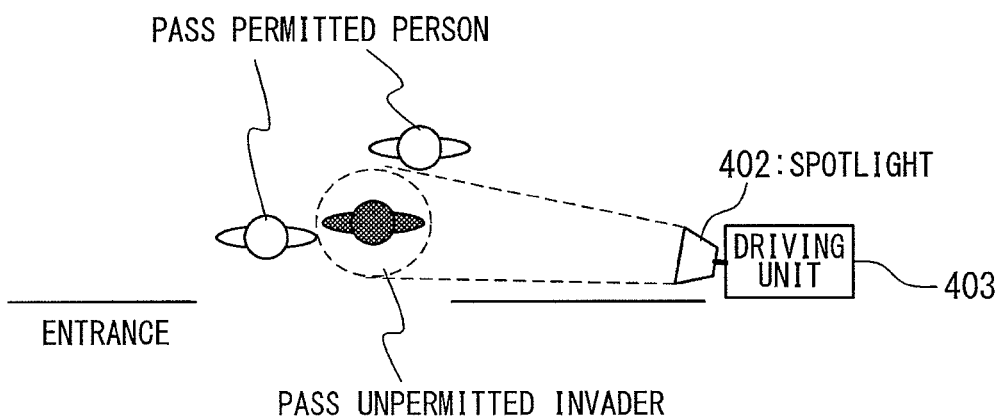
FIG. 11 is a view showing another warning displaying example by the reporting unit in the first exemplary embodiment according to the present invention.

As one example of the method in which the report of the invader currently being tracked and the report of the judged result by the place judging unit are carried out inside the office serving as the monitored area, there is a method of emitting the light of a spotlight 402 to the invader, as shown in FIG. 11. The spotlight 402 is designed such that a driving unit 403 can be used to change the emitting method of the light, and the color of the emitted light can be changed. The report controlling unit 350 controls the driving unit 403 to emit the light of the spotlight 402 to the invader who exists at the position specified by the invader tracking unit 330, and consequently reports who is the invader. At this time, by concentrating the spotlight to only the invader, it is possible to specify who is the invader, even if the plurality of persons can pass through the entrance. Thus, the person who is permitted to pass is not mistaken for the invader. Also, a color of illumination light is switched to the different color. For example, it is blue when the invader exists in the handling available area, and it is red when the invader exists in the handling unavailable area. Hence, whether or not the invader exists in the handling available area can be reported.

Figure 12:
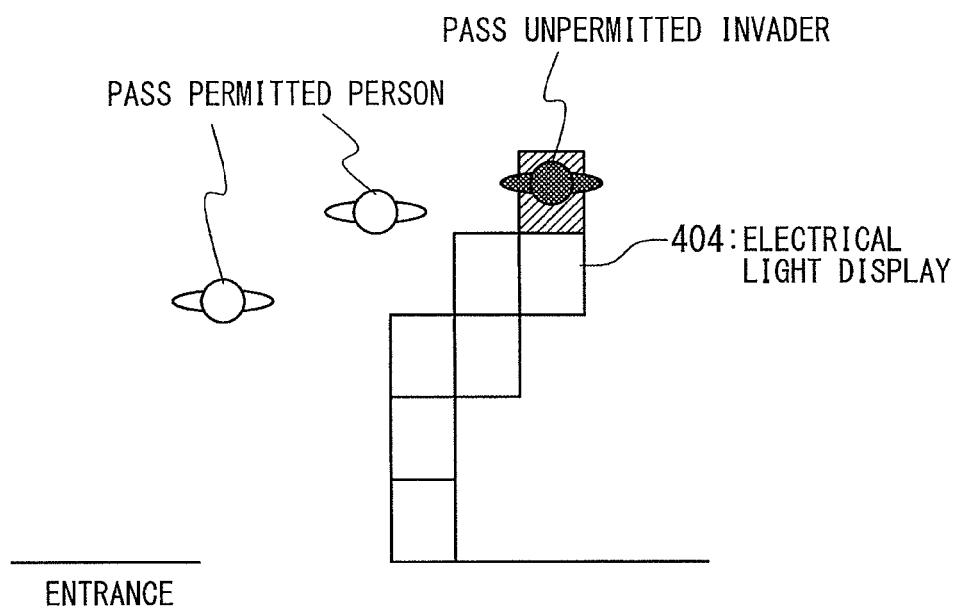
FIG. 12 is a view showing still another warning displaying example by the reporting unit in the first exemplary embodiment according to the present invention.

As one example of another method in which the report of the invader currently being tracked and the report of the judged result by the place judging unit are carried out inside the office serving as the monitored area, as shown in FIG. 12, there is a method of attaching an electrical light display 404 into the floor of the office and then changing a color of the floor just below the invader to a particular color. The electrical light display 404 can change the position at which the particular color is displayed and can also change the displayed color. The report controlling unit 350 controls the electrical light display 404, and changes the color of the floor just below the invader, who exists at the position specified by the invader tracking unit 330, to the particular color, and consequently reports who is the invader. At this time, by changing the color of the floor only just below the invader to the particular color, it is possible to specify who is the invader, even if the plurality of persons can pass through the entrance. Thus, the person who is permitted to pass is not mistaken for the invader. Also, by switching the particular color to the different color, for example, blue when the invader exists in the handling available area, or red when the invader exists in the handling unavailable area, it is possible to report whether or not the invader exists in the handling available area. Moreover, as shown in FIG. 12, by changing the color of the floor of the route through which the invader passes, it is possible to make the tracking of the invader easier.

The second exemplary embodiment of the monitoring system according to the present invention will be described below in detail with reference to the drawings.

Figure 13:
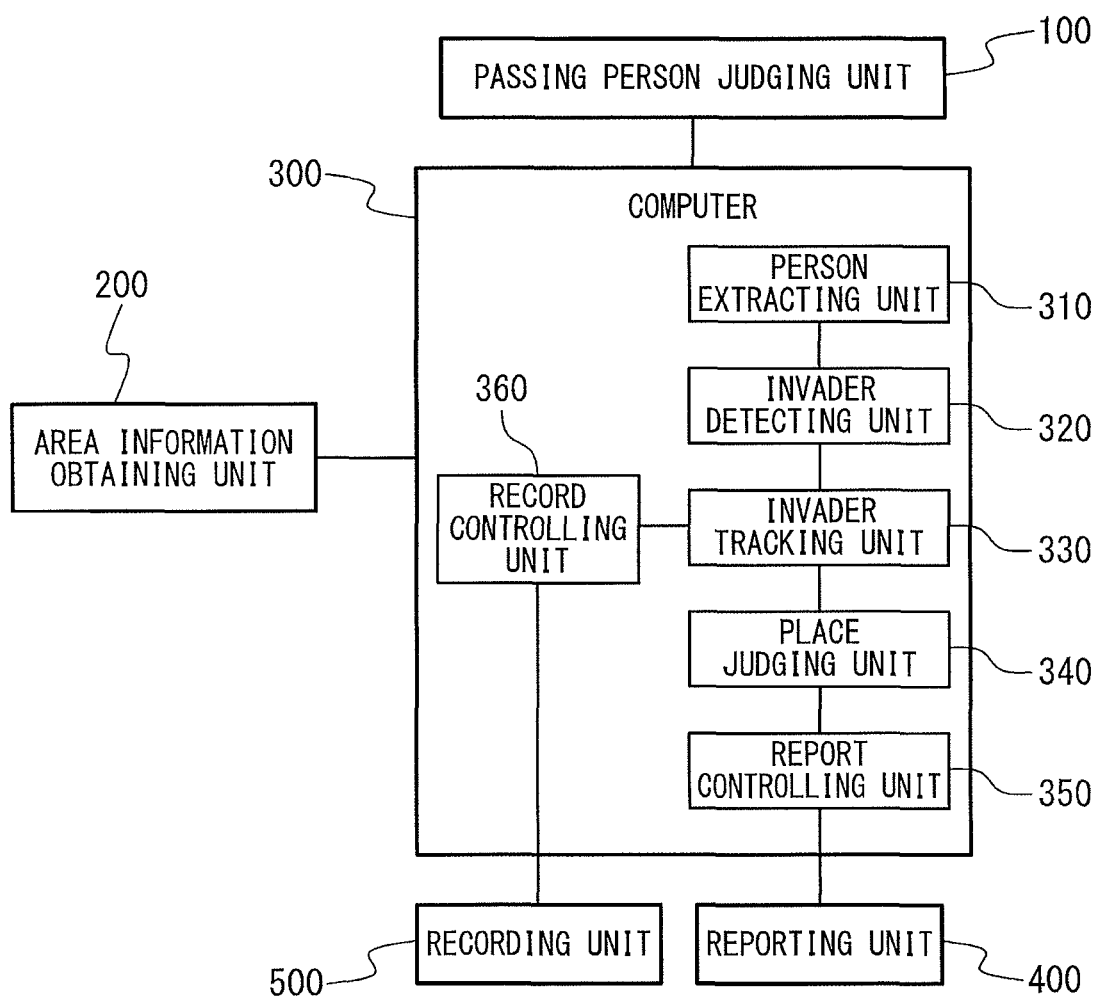
FIG. 13 is a block diagram showing a configuration of the monitoring system in a second exemplary embodiment according to the present invention.

With reference to FIG. 13, the monitoring system according to the second exemplary embodiment of the present invention differs from the first exemplary embodiment shown in FIG. 1 in that a record controlling unit 360 and a recording unit 500 are further included therein, and the other configurations are similar.

The recording unit 500 is a recording medium such as a video picture recording disc, an IC (Integrated Circuit) memory or the like.

The record controlling unit 360 carries out control in which the action of the invader currently being tracked by the invader tracking unit 330 is recorded in the recording unit 500 so that it can be retrieved in future. The recording of the action of the invader is carried out, for example, by recording the video picture of the invader inside the area information that is obtained by the area information obtaining unit 200. Also, the record controlling unit 360 may carry out control in which the past position information of the invader obtained by the invader tracking unit 330 is recorded as a movement route in the recording unit 500. Consequently, it is possible to easily check the movement route of the invader.

Figure 14:
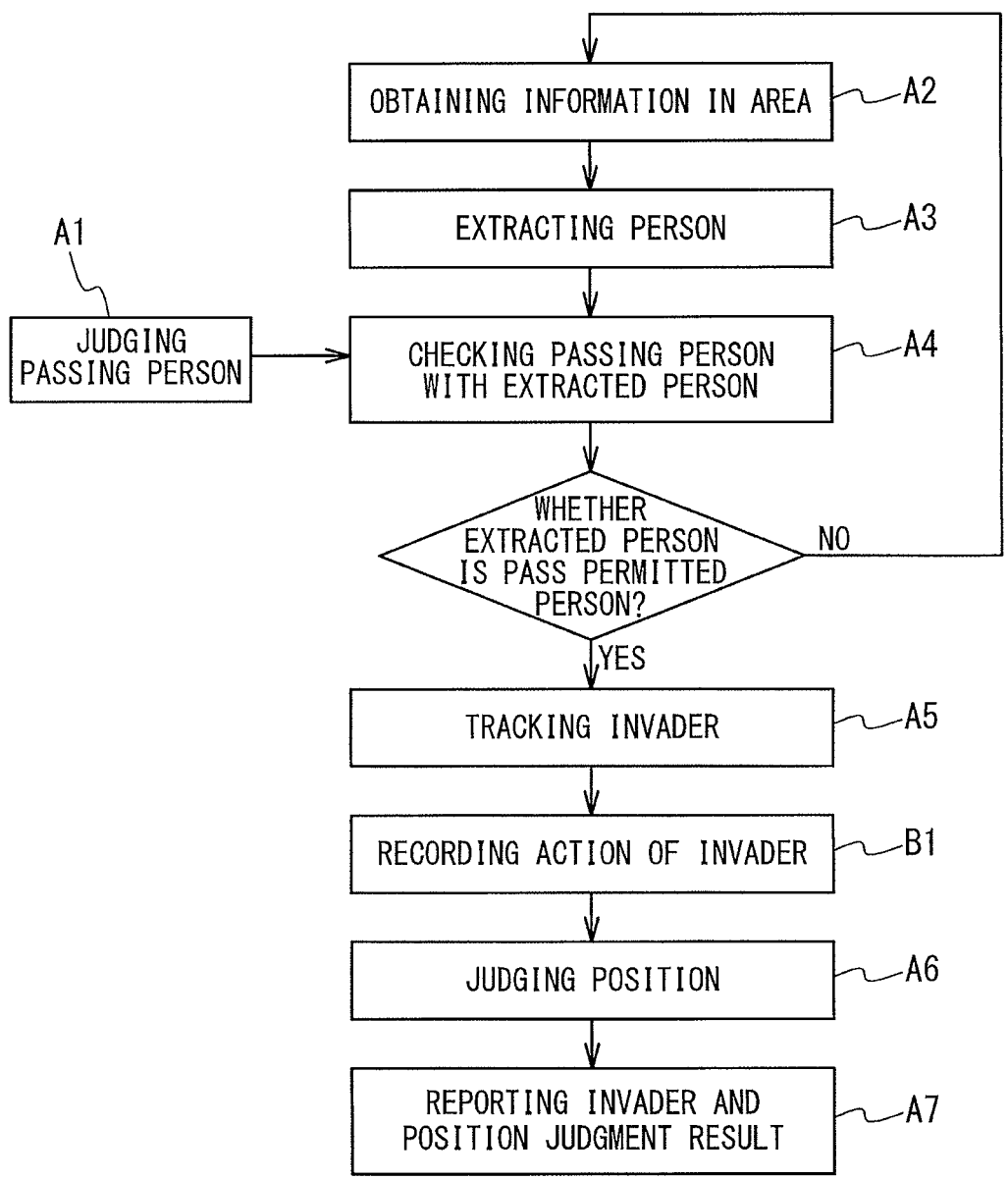
FIG. 14 is a flowchart showing an operation of the monitoring system in the second exemplary embodiment according to the present invention.

The entire operations of the monitoring system in this exemplary embodiment will be described below in detail with reference to the flowcharts in FIG. 13 and FIG. 14.

The operations of the passing person judging unit 100, the area information obtaining unit 200, the person extracting unit 310, the invader detecting unit 320, the invader tracking unit 330, the place judging unit 340, the report controlling unit 350 and the reporting unit 400 are equal to the respective configurations to which the same symbols are assigned in the first exemplary embodiment.

When the invader detecting unit 320 detects the invader, the invader tracking unit 330 tracks the invader. However, at that time, the record controlling unit 360 records action of this invader in the recording unit 500 (Step B1 in FIG. 14).

The effect of this exemplary embodiment will be described below.

This exemplary embodiment is designed such that the recording unit 500 records the action inside the area of the invader. Thus, it is possible to know the content of the fraudulent action executed by the invader.

Moreover, the recording unit 500 is designed to record only the action and movement route of the invader. Thus, action of the person who is permitted to pass is not recorded, which can protect privacy of the person who is permitted to pass.

The second exemplary embodiment will be described below in detail by exemplifying a specific example.

Figure 15:
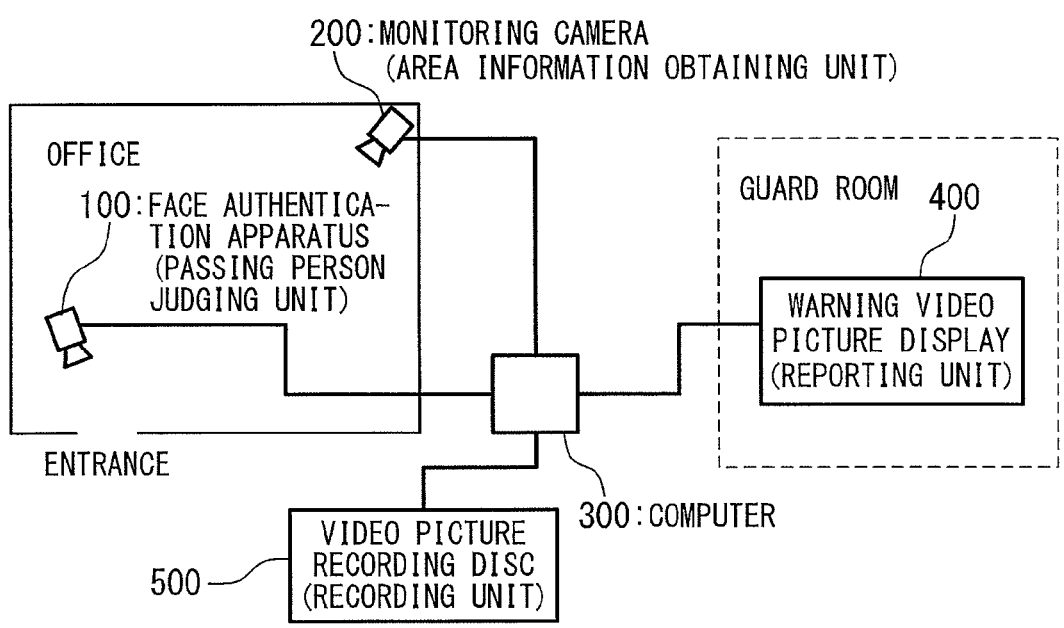
FIG. 15 is a block diagram showing one example of a configuration of the monitoring system in the second exemplary embodiment according to the present invention.

FIG. 15 is a block diagram of the specific example of the second exemplary embodiment, and this differs from the specific example of the first exemplary embodiment shown in FIG. 3 in that a video picture recording disc 501 is included as the recording unit 500. Then, the other configurations carry out the operations similar to the specific example in the first exemplary embodiment.

The recording unit 500 records only the video picture of the invader currently being tracked by the invader tracking unit 330.

In this way, in this specific example, the action of the invader is recorded, which can check the style of the fraudulent action of the invader. Even if the invader runs away before being caught by the guard, the invader can be specified from the recording video picture of the invader.

Also, in this specific example, only the action of the invader is recorded. Thus, the action of the person who is permitted to enter the room is not recorded, and the privacy of the person who is permitted to enter the room is never invaded.

This exemplary embodiment is described by using the video picture recording disc 500 as the recording unit 500. However, it can be recorded by using any recording medium, such as a hard disc, DVD, a magnetic tape, an IC memory and the like. Also, this exemplary embodiment is described by using the example of recording the video picture of the invader. However, the history of the position and the like can be recorded, in addition to the video picture of the invader.

As mentioned above, the present invention is described by exemplifying the several exemplary embodiments. However, the present invention is not limited to the above-mentioned exemplary embodiments. The other various additions and modifications can be performed thereon.

For example, in the above-mentioned exemplary embodiments, the fraudulent person invading the particular area such as the room or the like, is targeted for the monitoring. However, the person who exits from the particular area without any permission can be targeted for the detection. For example, in a nursing-care home for the aged and the like, the pass monitoring point is installed at the exit of a living room, and a dweller who exits from the living room without any permission at night and the like is detected and tracked. Then, the report of the detected dweller and the report of the judgment result as to whether or not the person exists in the handling available area may be carried out by a reporting unit installed in a nurse room or the like. In this case, for example, when a place in which dangerous equipments and the like are not arranged in the periphery is set as the handling available area, it is possible to safely ensure the body of the wandering dweller.

Also, in the above-mentioned exemplary embodiments, the human is targeted for the monitoring. However, the material such as a car, a walking robot and the like can be targeted for the monitoring.

Also, as for the monitoring system of the present invention, naturally, the functions can be attained in hardware and can be attained by using a computer with a monitoring program. The monitoring program is provided while being recorded on a computer-readable recording medium such as a magnetic disc, a semiconductor memory and the like, and this is read by the computer when the computer is started up. Then, the monitoring program controls an operation of the computer, thereby making the computer function as the person extracting unit, the invader detecting unit, the invader tracking unit, the place judging unit, the report controlling unit and the record controlling unit in the above-mentioned respective exemplary embodiments, and the above-mentioned processes are carried out.

A first monitoring system of the present invention includes: a passing material judging means judging whether a material passing through a pass monitoring point is a pass permitted material that is permitted to pass or a pass unpermitted material except the pass permitted material; a tracking means tracking a position of the pass unpermitted material that is judged to pass through the pass monitoring point by the passing material judging means; a place judging means judging whether or not a current position of the pass unpermitted material currently being tracked is a place at which a predetermined handling is performed on the pass unpermitted material; and a report control means carrying out control in which the pass unpermitted material currently being tracked and the judged result by the place judging means are reported by a reporting means.

A first monitoring method of the present invention includes: (a) a passing material judging step of judging whether a material passing through a pass monitoring point is a pass permitted material that is permitted to pass or a pass unpermitted material except the pass permitted material; (b) a tracking step of tracking a position of the pass unpermitted material that is judged to pass through the pass monitoring point by the passing material judging step; (c) a place judging step of judging whether or not a current position of the pass unpermitted material currently being tracked is a place at which a predetermined handling is performed on the pass unpermitted material; and (d) a reporting step of reporting the pass unpermitted material currently being tracked and the judged result by the place judging step by using the reporting means.

A first monitoring program of the present invention instructs a computer to function as: a passing material judging means judging whether a material passing through a pass monitoring point is a pass permitted material that is permitted to pass or a pass unpermitted material except the pass permitted material; a tracking means tracking a position of the pass unpermitted material that is judged to pass through the pass monitoring point by the passing material judging means; a place judging means judging whether or not a current position of the pass unpermitted material currently being tracked is a place at which a predetermined handling is performed on the pass unpermitted material; and a report control means carrying out control in which the pass unpermitted material currently being tracked and the judged result by the place judging means are reported by the reporting means.

According to the present invention, this can be used as an application for monitoring action of unpermitted persons and materials in a monitored area.

The invention claimed is:
1. A monitoring system comprising:
  a detecting unit configured to detect, when a pass unpermitted material passes through a pass monitoring point, said pass unpermitted material as a fraudulent passing material;
  a tracking unit configured to track a position of said fraudulent passing material detected by said detecting unit;
  a place judging unit configured to judge whether or not said fraudulent passing material exists inside a handling available area proper for performing a predetermined handling on said fraudulent passing material, based on said position of said fraudulent passing material specified by said tracking unit; and
  a reporting unit configured to visibly report said position of said fraudulent passing material and said judged result by said place judging unit,
  wherein said place judging unit includes:
    a storage unit configured to store information of a distance to be a threshold, and
    a judging unit configured to judge whether or not a pass permitted material preliminarily permitted to pass through said pass monitoring point exists within a range of said distance to be said threshold from said fraudulent passing material.
2. The monitoring system according to claim 1, wherein said storage unit stores information of distances to be said threshold while said distances to be said threshold are correlated with a plurality of areas in a monitoring area, respectively, and wherein said judging unit judges whether or not said pass permitted material exists by using a distance to be said threshold correlated with an area where said fraudulent passing material exists.

3. A monitoring system comprising:
a detecting unit configured to detect, when a pass unpermitted material passes through a pass monitoring point, said pass unpermitted material as a fraudulent passing material;
a tracking unit configured to track a position of said fraudulent passing material detected by said detecting unit;
a place judging unit configured to judge whether or not said fraudulent passing material exists inside a handling available area proper for performing a predetermined handling on said fraudulent passing material, based on said position of said fraudulent passing material specified by said tracking unit; and
a reporting unit configured to visibly report said position of said fraudulent passing material and said judged result by said place judging unit,
wherein said place judging unit includes:
a storage unit configured to preliminary store information indicating an area where there is no possibility to disturb action of a pass permitted material which is preliminarily permitted to pass through said pass monitoring point, or information indicating and area where there is no possibility to cause a danger to said pass permitted material as information indicating said handling available area.

4. A monitoring system comprising:
a detecting unit configured to detect, when a pass unpermitted material passes through a pass monitoring point, said pass unpermitted material as a fraudulent passing material;
a tracking unit configured to track a position of said fraudulent passing material detected by said detecting unit;
a place judging unit configured to judge whether or not said fraudulent passing material exists inside a handling available area proper for performing a predetermined handling on said fraudulent passing material, based on said position of said fraudulent passing material specified by said tracking unit; and
a reporting unit configured to visibly report said position of said fraudulent passing material and said judged result by said place judging unit,
wherein said detecting unit includes:
a passing material judging unit configured to judge whether or not a passing material which tries to pass through said pass monitoring point is a pass permitted material which is preliminarily permitted to pass,
an extracting unit configured to extract moving materials in a monitoring area, and
a fraudulent passing material detecting unit configured to detect as said fraudulent passing material said moving materials extracted by said extracting unit except moving materials judged as said pass permitted material by said passing material judging unit.

5. A monitoring system comprising:
a detecting unit configured to detect, when a pass unpermitted material passes through a pass monitoring point, said pass unpermitted material as a fraudulent passing material;
a tracking unit configured to track a position of said fraudulent passing material detected by said detecting unit;
a place judging unit configured to judge whether or not said fraudulent passing material exists inside a handling available area proper for performing a predetermined handling on said fraudulent passing material, based on said position of said fraudulent passing material specified by said tracking unit; and
a reporting unit configured to visibly report said position of said fraudulent passing material and said judged result by said place judging unit,
wherein said reporting unit includes:
a spotlight configured to illuminate said fraudulent passing material by using light with a color corresponding to said judged result by said place judging unit.

6. A monitoring system comprising:
a detecting unit configured to detect, when a pass unpermitted material passes through a pass monitoring point, said pass unpermitted material as a fraudulent passing material;
a tracking unit configured to track a position of said fraudulent passing material detected by said detecting unit;
a place judging unit configured to judge whether or not said fraudulent passing material exists inside a handling available area proper for performing a predetermined handling on said fraudulent passing material, based on said position of said fraudulent passing material specified by said tracking unit; and
a reporting unit configured to visibly report said position of said fraudulent passing material and said judged result by said place judging unit,
wherein said reporting unit includes:
an electrical light display configured to emit light from a floor of an area where said fraudulent passing material exists in a floor of a monitoring area by using light with a color corresponding to said judged result by said place judging unit.

7. A monitoring method comprising:
detecting, when a pass unpermitted material passes through a pass monitoring point, said pass unpermitted material as a fraudulent passing material;
tracking a position of said fraudulent passing material detected by said detecting step;
judging whether or not said fraudulent passing material exists inside a handling available area proper for performing a predetermined handling on said fraudulent passing material; and
visibly reporting said position of said fraudulent passing material and said judged result by said step of judging whether or not said fraudulent passing material exists inside said handling available area,
wherein said step of judging whether or not said fraudulent passing material exists inside said handling available area, includes:
a storage means configured to store information of a distance to be a threshold, and
judging whether or not a pass permitted material preliminarily permitted to pass through said pass monitoring point exists within a range of a predetermined distance to be a threshold from said fraudulent passing material.

8. The monitoring method according to claim 7, further comprising:
storing information of distances to be said threshold while said distances to be said threshold are correlated with a plurality of areas in a monitoring area, respectively, and
wherein said step of judging whether or not said pass permitted material exists, includes:
judging whether or not said pass permitted material exists by using a distance to be said threshold correlated with an area where said fraudulent passing material exists.

9. A monitoring method comprising:
detecting, when a pass unpermitted material passes through a pass monitoring point, said pass unpermitted material as a fraudulent passing material;
tracking a position of said fraudulent passing material detected by said detecting step;
judging whether or not said fraudulent passing material exists inside a handling available area proper for performing a predetermined handling on said fraudulent passing material;
visibly reporting said position of said fraudulent passing material and said judged result by said step of judging whether or not said fraudulent passing material exists inside said handling available area; and
preliminary storing information indicating an area where there is no possibility to disturb action of a pass permitted material which is preliminarily permitted to pass through said pass monitoring point, or information indicating and area where there is no possibility to cause a danger to said pass permitted material as information indicating said handling available area.

10. A monitoring method comprising:
detecting, when a pass unpermitted material passes through a pass monitoring point, said pass unpermitted material as a fraudulent passing material;
tracking a position of said fraudulent passing material detected by said detecting step;
judging whether or not said fraudulent passing material exists inside a handling available area proper for performing a predetermined handling on said fraudulent passing material;
visibly reporting said position of said fraudulent passing material and said judged result by said step of judging whether or not said fraudulent passing material exists inside said handling available area,
wherein said detecting step includes:
judging whether or not a passing material which tries to pass through said pass monitoring point is a pass permitted material which is preliminarily permitted to pass,
extracting moving materials in a monitoring area, and
detecting as said fraudulent passing material said moving materials extracted by said extracting means except moving materials judged as said pass permitted material by said step of judging whether or not said passing material is said pass permitted material.

11. A monitoring method comprising:
detecting, when a pass unpermitted material passes through a pass monitoring point, said pass unpermitted material as a fraudulent passing material;
tracking a position of said fraudulent passing material detected by said detecting step;
judging whether or not said fraudulent passing material exists inside a handling available area proper for performing a predetermined handling on said fraudulent passing material;
visibly reporting said position of said fraudulent passing material and said judged result by said step of judging whether or not said fraudulent passing material exists inside said handling available area,
wherein said reporting step includes:
illuminating said fraudulent passing material by using light with a color corresponding to said judged result by said step of judging whether or not said fraudulent passing material exists inside said handling available area.

12. A monitoring method comprising:
detecting, when a pass unpermitted material passes through a pass monitoring point, said pass unpermitted material as a fraudulent passing material;
tracking a position of said fraudulent passing material detected by said detecting step;
judging whether or not said fraudulent passing material exists inside a handling available area proper for performing a predetermined handling on said fraudulent passing material;
visibly reporting said position of said fraudulent passing material and said judged result by said step of judging whether or not said fraudulent passing material exists inside said handling available area,
wherein said reporting step includes:
emitting light from a floor of an area where said fraudulent passing material exists in a floor of a monitoring area by using light with a color corresponding to said judged result by said step of judging whether or not said fraudulent passing material exists inside said handling available area.

* * * * *